UNITED STATES PATENT OFFICE.

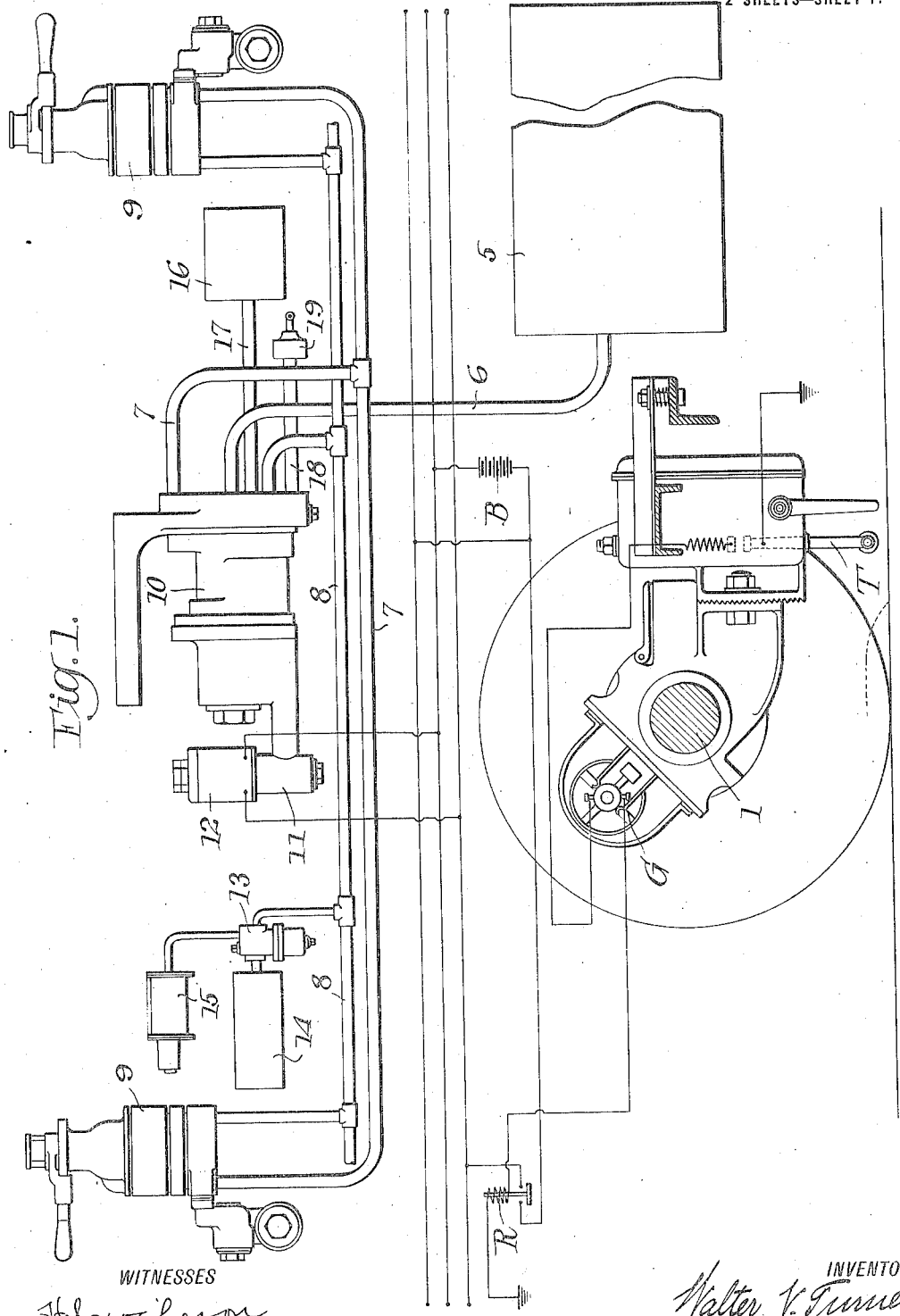

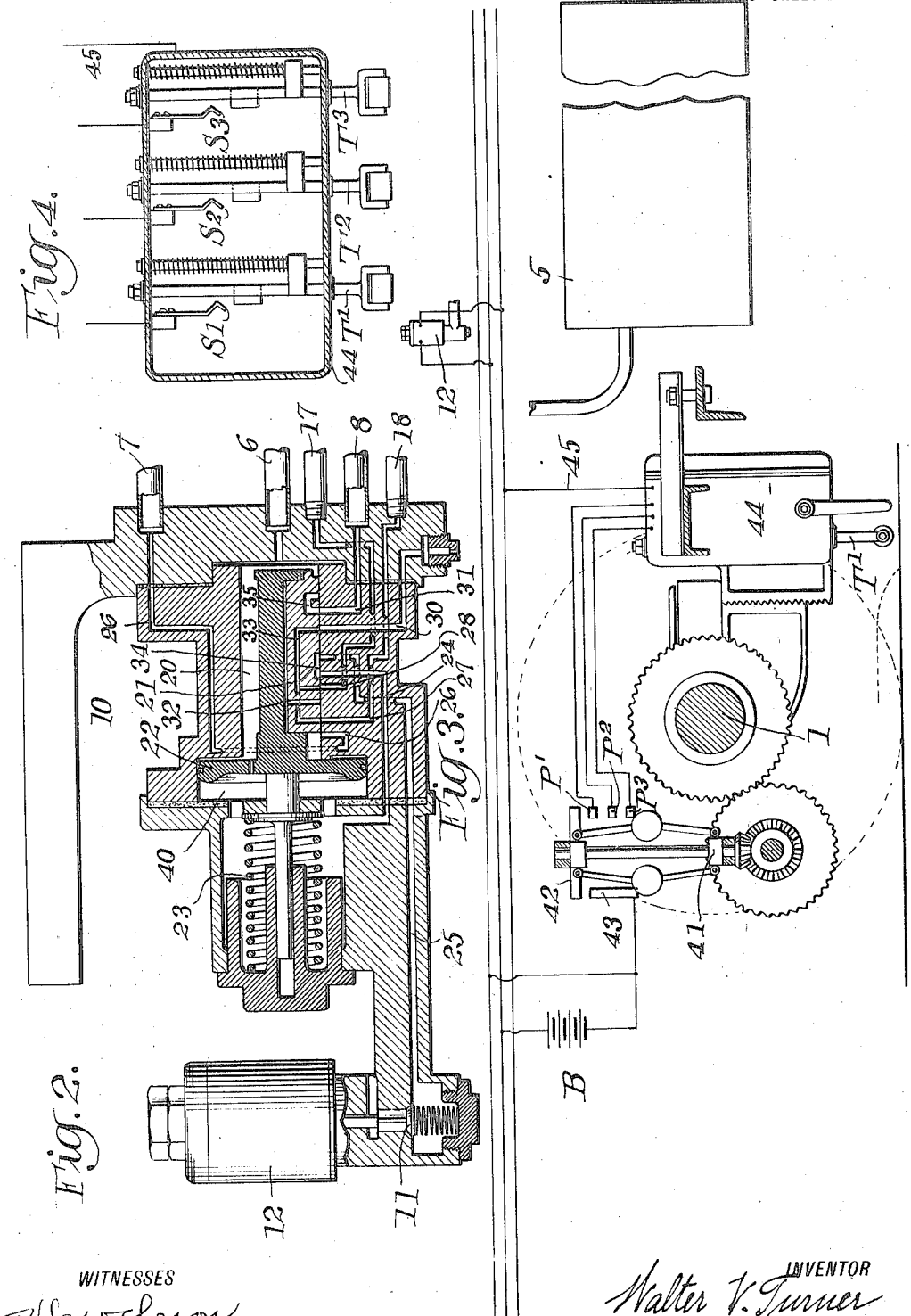

WALTER V. TURNER, OF EDGEWOOD BOROUGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPEED-CONTROLLED BRAKE APPARATUS.

1,255,357.    Specification of Letters Patent.    Patented Feb. 5, 1918.

Application filed February 23, 1915. Serial No. 9,895.

*To all whom it may concern:*

Be it known that I, WALTER V. TURNER, a citizen of the United States, residing at the borough of Edgewood, in the county of Allegheny and State of Pennsylvania, have invented a certain new and useful Improvement in Speed-Controlled Brake Apparatus, of which improvement the following is a specification.

This invention relates to fluid pressure brakes for railway vehicles, and more particularly to brake apparatus governed by the speed of the vehicle and by certain conditions along the track where it is desired to automatically control the speed of the car or train and restrict the maximum speed within certain safe limits, the object being to provide a speed controlled means and improved valve devices governed thereby for automatically closing and opening the supply of fluid from the main reservoir to the brake pipe, and for controlling a vent from the brake pipe, to effect an application of the brakes when the speed exceeds a predetermined limit, and to release the brakes when the speed has been reduced to a certain rate.

In the accompanying drawings: Figure 1 is a diagram illustrating a brake apparatus and speed controlled means embodying my improvement; Fig. 2, a diagrammatic section of my improved fluid pressure valve device; Fig. 3, a diagrammatic view illustrating an improved speed governing mechanism for controlling the circuits of the electromagnets; and Fig. 4, a transverse sectional view showing the circuit switches of the track trip devices.

The vehicle may be equipped with the usual standard fluid pressure brake apparatus, comprising main reservoir, 5, brake valves, 9, train brake pipe, 8, triple valve, 13, auxiliary reservoir, 14, and brake cylinder, 15. As shown in Fig. 1, my improved valve device, 10, is introduced into the pipe connections between the main reservoir and the brake valve, being connected by pipe, 6, to the main reservoir, and by pipe, 7, to the brake valve, 9, or to both brake valves at opposite ends of the car in the case of a double end equipment. It may obviously be connected between the brake valve and the brake pipe, if preferred, since in either case it serves to control the supply of fluid from the main reservoir to the brake pipe.

The valve device, 10, which is shown more in detail in Fig. 2, comprises a valve chamber, 20, communicating directly with the main reservoir through pipe, 6, and containing a slide valve, 21, and operating piston, 22. The fluid pressure from the main reservoir in the valve chamber, 20, equalizes around the piston, 22, or through a small port therein, into the chamber, 40, on the other side of said piston so that the same is normally balanced as to fluid pressure when chamber, 40, is closed, and the piston and valve are held in the position shown by means of the spring, 23.

In the slide valve, 21, are located the cavities or passages, 33, 34 and 35, and the through port, 32, while the seat of said slide valve is provided with ports, 26, communicating with pipe, 7, port, 31, connected to the brake pipe, 8, and a vent port, 30, leading to the atmosphere or brake cylinder, as desired. In the normal position of the valve, as shown in Fig. 2, the port, 26, is open to the valve chamber, 20, so that the supply of fluid from the main reservoir has free access to the pipe, 7, and through the brake valve and its usual feed valve to the train brake pipe charging the same in the ordinary way. The brake system may then be controlled by the manipulation of the brake valve in the usual manner.

In order to effect an application of the brakes automatically when a given speed is exceeded, I preferably employ a valve means, such as valve, 11, with an electromagnet, 12, and speed controlled means governing the same, for varying the pressure upon the piston, 22, to actuate the valve, 21. A port or passage, 24, leads from the chamber, 40, directly or indirectly to the valve, 11, which is normally closed. When the circuit to the electromagnet is closed by the speed controlled means, the magnet is energized to open valve, 11, and release fluid under pressure from chamber, 40, at one side of the piston, 22. The pressure acting on the valve chamber side of the piston then moves the same, together with the valve, 21, to the opposite position in which the piston is seated against the gasket. This movement of the valve operates to cut off the supply of fluid from the main reservoir through port, 26, and pipe, 7, to the brake valve and the brake pipe, and to connect ports, 31 and 30, through cavity, 35, thereby releasing fluid from the brake pipe through the restricted vent port, 30, and causing a service application of the brakes. When the speed is sufficiently reduced to deënergize the magnet, 12, the valve, 11, closes, and as the pressure then promptly equalizes around the piston, 22, the spring, 23, operates to return the piston and valve to the normal position in which the brake pipe vent is closed, and fluid from the main reservoir is again supplied to the brake valve and brake pipe to release the brakes in the usual manner.

The valve, 11, may discharge directly to the atmosphere, and if the chamber, 40, is connected directly to the valve, 11, the piston and valve, 21, will remain in the brake applying position only as long as the valve, 11, stands open; but according to another feature of my improvement, I prefer that the valve device should remain a given length of time in the brake applying position after having been moved to that position. For this purpose the port or passage, 24, from the chamber, 40, is controlled by the slide valve, 21, through the cavity, 34, therein, which in the release position of the valve connects port, 24, with the port, 25, leading to the valve, 11, but in the application position connects said port, 24, with port, 28, leading to pipe, 17, and timing reservoir, 16. With this construction, when the valve, 21, is moved over to application position by the opening of valve, 11, fluid under pressure from the main reservoir in chamber, 20, will flow through the restricted port in piston, 22, passage, 24, cavity, 34, passage, 28, and pipe, 17, to the timing reservoir, 16, until the pressure therein equalizes with that in chamber, 20, whereupon the piston, 22, being balanced as to fluid pressure, the spring, 23, will return the valve to release position. By this means the brakes will remain applied a given period of time, depending upon the size of the timing reservoir, which may be varied to suit the conditions by using different sizes of reservoirs. When the valve, 21, is returned to release position, the fluid from the timing reservoir is exhausted to the atmosphere through ports, 28, 33, and 30.

If it be desired to also throw the circuit breaker automatically, in order to cut off the supply of current to the propelling motors at the time that the valve device moves to apply brakes, this may be accomplished by providing the valve, 21, with a through port, 32, adapted to register with the port, 27, and supply fluid from the main reservoir to the pipe, 18, and circuit breaker cylinder, 19, to actuate the piston therein when the valve, 21, is thrown to application position. When in release position the circuit breaker cylinder is released to the atmosphere through ports, 27, 33 and 30.

Any suitable or preferred form of speed controlled means may be employed for governing the circuit to the coil, 12, of the magnet valve, 11, that indicated in Fig. 1 comprising a generator, G, driven from the axle, 1, and connected in a circuit with a relay switch, R, controlling a circuit from a battery B to the magnet, 12. Where it is desired that the generator circuit should be closed at certain sections or zones along the track, and the resistance in said circuit varied for different zones, trip devices or plungers, T, of which there may be a plurality, arranged transversely of the car, are provided for engaging certain ramps located along the track at the respective speed limited zones, whereby the generator circuit will be closed with the proper amount of resistance for the desired maximum rate of speed desired or permissible at each particular zone. If this rate of speed is not exceeded, then the current generated in said circuit will not be sufficient to operate the relay switch, R, but if the rate of speed is excessive, the relay switch will be actuated to close the battery circuit to the magnet coil, 12, and the brakes will be automatically applied as before described. This particular form of speed controlled means is not, however, claimed specifically as my invention since it has been heretofore used in other connections.

Another feature of my improvement does relate, however, to the particular form of speed controlled means indicated in Figs. 3 and 4 of the drawings, and in which a centrifugal speed governor device, 41, is driven from the axle, and is provided with a switch bar, 42, adapted to close a circuit between the contact, 43, connected to one terminal of the battery, B, and either one of a plurality of contacts, $P^1$, $P^2$, $P^3$, connected by the respective wires to the contact switches, $S^1$, $S^2$ and $S^3$, actuated by the respective trip plungers, $T^1$, $T^2$ and $T^3$, adapted to engage corresponding ramps along the track. The casing, 44, in which the plungers are mounted may be connected by a ground or return wire, 45, with the train line leading to one terminal of the magnet coil, 12, while another train line wire connects said magnet coil with the other terminal of the battery, B. If then, a zone is entered in which one of the plungers is raised by engagement with a ramp along the track, one of the contacts, $S^1$, $S^2$ or $S^3$, will be closed, and if the speed is such as to cause the centrifugal governor to move the switch bar to engage the corresponding contact, $P^1$, $P^2$ or $P^3$, the circuit from the battery to the magnet valve will be closed and the valve device will operate the brakes, as before described. The contacts, $P^1$, $P^2$, $P^3$, etc., are so located that it will require different speeds of the governor to make the different contacts, such as are desired for the respective speed limited zones along the track. In this way, each one of the speed controlling circuits is controlled by both the governor and by a trip device, so that only when closed by both is the valve device operated. This comprises a simple and efficient means for protecting the various zones along the track and allowing only certain different maximum rates of speed in the different zones.

Having now described my invention, what I claim as new and desire to secure by Letters Patent is:—

1. In a fluid pressure brake apparatus, the combination with a main reservoir and a brake pipe, of a valve having ports for venting fluid from the brake pipe, a piston normally subject to fluid pressure upon its opposite sides for actuating said valve, a fluid supply connection from the reservoir to one side of said piston, a speed controlled vent valve for releasing fluid from the other side of said piston, and means for moving said valve to the normal release position upon the equalization of fluid pressures on said piston.

2. In a fluid pressure brake apparatus, the combination with a main reservoir, and an automatic brake pipe, of a valve having ports for supplying fluid from the main reservoir to the brake pipe in the nomal release position, and for venting fluid from the brake pipe in the application position, a piston subject to fluid pressure for actuating said valve, a vent valve for releasing fluid from one side of said piston, a timing reservoir, and means for establishing communication from the timing reservoir to one side of said piston and for cutting off communication therefrom to the vent valve in the application position of the valve, and for exhausting fluid from the timing reservoir in the release position of the valve.

3. In a fluid pressure brake apparatus, the combination with a main reservoir and automatic train brake pipe, of a valve having ports for supplying fluid from the main reservoir to the train pipe and for venting fluid from the train pipe, a piston normally subject to fluid pressure on its opposite sides for actuating said valve, a magnet valve for controlling the release of fluid from one side of said piston, and a speed controlled means governing the circuit to said magnet.

4. In a fluid pressure brake apparatus, the combination with a train brake pipe, of a valve having ports for controlling a vent from said brake pipe, a piston subject to fluid pressure for actuating said valve, a speed controlled device for controlling the pressure in the chamber on one side of said piston, and a timing reservoir adapted to be connected with the piston chamber.

5. In a fluid pressure brake apparatus, the combination with a train brake pipe, of a valve having ports for controlling a vent from said brake pipe, a piston subject to fluid pressure for actuating said valve, a speed controlled device for controlling the pressure in the chamber on one side of said piston, a timing reservoir, and means for connecting the piston chamber with either the speed controlled device or the timing reservoir.

6. In a fluid pressure brake apparatus, the combination with a train brake pipe, of a valve having ports for controlling a vent from said brake pipe, a piston subject to fluid pressure for actuating said valve, a vent valve for releasing fluid from the piston chamber, speed controlled means for governing the vent valve, a timing reservoir, and means controlled by the movement of said piston for cutting off communication from the piston chamber to the vent valve and opening communication from said piston chamber to the timing reservoir.

7. In a fluid pressure brake apparatus, the combination with a main reservoir and automatic train brake pipe, of a timing reservoir, valve means controlling a supply from the main reservoir to the train pipe, a vent from the train pipe, and communication with the timing reservoir, and a speed controlled device for controlling the operation of said valve means.

8. In a fluid pressure brake apparatus, the combination with a magnet valve for controlling an application of the brakes, of a plurality of trip devices adapted to engage corresponding ramps along the track, contact switches operated by the respective trip devices and connected to the coil of said magnet, and a speed governor mechanism having a plurality of contacts connected to the respective circuits of the trip operated contacts.

In testimony whereof I have hereunto set my hand.

WALTER V. TURNER.

Witnesses:
A. M. CLEMENTS,
S. W. KEEFER.